United States Patent [19]

Harada

[11] 4,204,766

[45] May 27, 1980

[54] METHOD AND APPARATUS FOR CONTROLLING TONER CONCENTRATION OF A LIQUID DEVELOPER

[75] Inventor: Yoshiaki Harada, Hachioji, Japan

[73] Assignee: Konishiroku Photo Industry Co., Ltd., Tokyo, Japan

[21] Appl. No.: 808,804

[22] Filed: Jun. 22, 1977

[30] Foreign Application Priority Data

Jun. 30, 1976 [JP] Japan ................................ 51-77176

[51] Int. Cl.[2] .............................................. G01A 3/46

[52] U.S. Cl. .................................... 356/404; 356/443

[58] Field of Search ............................ 96/166, 48, 77; 356/175, 38, 201, 180, 18, 208, 202, 244, 203, 192, 193, 404; 118/646, 7, 48; 73/424; 355/32, 88

[56] References Cited

U.S. PATENT DOCUMENTS

| | | | |
|---|---|---|---|
| 3,702,403 | 11/1972 | Kishi | 356/442 |
| 3,943,771 | 3/1976 | Handa et al. | 356/244 |
| 4,032,227 | 6/1977 | Hubbard et al. | 118/646 |
| 4,043,293 | 8/1977 | Ruckdeschel | 118/646 |
| 4,054,230 | 10/1977 | Suzuki et al. | 118/646 |

*Primary Examiner*—John K. Corbin
*Assistant Examiner*—B. W. de los Reyes
*Attorney, Agent, or Firm*—Bierman & Bierman

[57] ABSTRACT

Method and apparatus for detecting and controlling the concentration of active toner particles in a liquid developer comprising taking a sample or proportion of liquid developer and subjecting it to an electrostatic field, measuring the toner particle concentration influenced by the field and correcting the concentration of effective toner particles in the developer by restoring said concentration to an acceptable predetermined level, and further measuring the concentration of degraded toner particles left in the liquid developer to determine if the entire developer is to be replaced.

11 Claims, 5 Drawing Figures

METHOD AND APPARATUS FOR CONTROLLING TONER CONCENTRATION OF A LIQUID DEVELOPER

The present invention relates to a method and apparatus for maintaining the capability of a liquid developer for use in an electrophotographic apparatus and an electrostatic recording machine.

Photosensitive materials or electrostatic recording papers having latent images formed thereon according to an electrophotograhic process or electrostatic recording process, are developed with colored charged particles called "toners". According to the liquid developing method, a liquid developer formed by dispersing a toner in a liquid medium is used for development and a latent image is visualized by the electrophoresis of the toner. In a liquid developer of this type, with the increase of the number of developed images, the toner in the developer is consumed and the amount of the toner is decreased, resulting in reduction of the image density or contrast. Accordingly, in order to always obtain an excellent quality of and appropriate copied images, it is necessary to maintain the concentration of toner particles in the liquid developer at a constant level. In general, the toner concentration in the liquid developer is detected and a concentrated developer is supplied to maintain a prescribed toner concentration when the quantity of the toner is decreased to some extent.

In monochromatic development, according to the conventional concentration controlling method, the range of variation in toner concentration is relatively broad and there is a considerable difference of the image density between an image developed just after supply of the concentrated developer and an image developed just before supply of the concentrated developer. Such difference in image density is practically permissible because of the fact that originals comprise a large number of lines and the difference in the image density is not so conspicuous. However, in case of a color copying machine for which development of an continuous tone or half tone image is required, such difference in concentration or density as mentioned above is not permissible and strict control of the toner concentration is required. In general, color images are formed by three toners differing in color, namely cyan, magenta and yellow toners. If a good balance among these three colors is lost, precise color reproduction becomes impossible, and undesirable phenomena such as tailing and image flow, described hereinafter, are caused owing to degradation of the toners. Accordingly, in reproduction of color images, in order to prevent occurrence of such undesirable phenomena, it is necessary to maintain toner concentrations strictly at constant levels, and development of a toner concentration detecting apparatus enabling such concentration control has eagerly been desired in the art.

As conventional methods for detecting toner concentration in a liquid developer, there are known methods measuring density, leakage current or transmission concentration, and of these known methods, methods in which the toner concentration is detected by optical means are adopted most popularly. However, conventional methods for detecting the toner concentration by optical means are defective in that precise measurement results cannot be obtained when degradation is caused in developers. Degradation of developers, therefore, will now be described.

It is known that in general, while a developer is used repeatedly, its capacity is gradually degraded. The degradation is caused by the lapse of time and especially when a mechanical flowing power or electric bias voltage is applied, the degradation is conspicuous. In the degraded toner, the quantity of charging on toner particles is reduced and the electrophoresis mobility of the toner particles is low even in the presence of a strong electric field, and therefore, it takes a long time to enhance the density of the resulting image. Consequently, when development is conducted for a prescribed period of time, the image density is reduced. If degradation proceeds extremely, the developer, especially the toner particles, becomes unreactive even under an electric field, and the adhering force of the toner particles is lowered and they cannot be bonded tightly to the surface of a latent image, causing streak and image flow. Moreover, the repulsive force among the toner particles is reduced and therefore, cohesion takes place and sedimentation of agglomerated toner particles is often caused. Masses of agglomerated toner particles contaminate the liquid developer, and when they adhere to an optical detecting element at the measurement of the toner concentration, an erroneous measurement value is given and automatic control of the toner concentration is hindered.

Since the measurement of the toner concentration is performed in the conventional methods by applying rays directly to a liquid developer and utilizing reflection or transmission of the applied rays, results of the measurement include those of toner particles having a normal action and of degraded toner particles and precise results can be obtained. Further, since the developer generally contains a dye as a charge controlling agent and most of the dyes used in this field do not adhere to a latent image, while the liquid developer is supplied repeatedly, the dye is accumulated and finally, contamination with such dye cannot be neglected. As will be apparent from the foregoing illustration, according to the conventional methods, it is impossible to determine the concentration of normal toner particles alone, that practically contribute to development of a latent image.

There is a recent trend that a highly concentrated liquid developer has been used for an electrophotographic method including a transfer step and electrostatic latent images having smaller surface potential. In this case, however, it is quite difficult to use a optical means of transmission type for detection of toner concentration of the liquid developer.

It is therefore a primary object of the present invention to solve the foregoing problems involved in the conventional methods for the measurement of the toner concentration and establish a method for precisely controlling the toner concentration in which only effective toner particles in a liquid developer are attracted to an electrode and thus are separated from degraded toner particles, and the toner concentration is precisely determined and also the degree of degradation of the toner is determined from a liquid left after attraction of normal toner particles to the electrode. More specifically, according to the present invention, a part of the liquid developer is separated and introduced into a detecting cell, charged toner particles in the liquid developer are attracted and stuck to a detecting member by applying an electric field between electrodes disposed in the liquid developer, and they are separated from degraded toner particles which are not attracted and stuck to the detecting member. Any of the members capable of attracting toner particles thereto can be used as the detecting member. For example, an electrically conductive member which may optionally have a film or coating of a dielectric member formed thereon can be used. Further, such detecting member may be composed of a transparent or reflecting material. In short, a suitable detecting member is chosen depending on the detecting method. For example, toner particles may be attracted directly to an attracting movable electrode as the detecting member, or they may be attracted to a movable screen-like member disposed in the vicinity of or in contact with the surface of a fixed or movable attracting electrode. The detecting member having the toner particles attracted thereto is transferred to a detecting zone disposed so that it is not contaminated with the liquid developer. Then, the amount of the toner particles attracted to the detecting member is measured appropriately. For example, rays are applied to the detecting member from a light source and the intensity of reflected rays or transmitted rays is determined and the toner concentration in the liquid developer is controlled. Control of the toner concentration is accomplished by determining the quantity of the toner and adjusting the amount of the toner so as to attain an appropriate toner concentration.

According to the concentration controlling method of the present invention, apparent increase in the toner concentration owing to degraded toner particles or a measurement error caused by intrusion of agglomerated toner particles in the detecting system can be effectively eliminated, and the effective toner concentration can be directly measured. Further, when the toner concentration of the residual liquid developer left after attraction of charged toner particles is measured, the degree of degradation of the toner particles can be known and the time of exchange of the used liquid developer with a fresh liquid developer can easily be determined. Either reflection type or transmission type photo-electric conversion can be adopted for measurement of the concentration. In case of the latter type conversion, however, a screen-like member to which toner particles are attracted or a movable attracting electrode must be formed of a light-transmitting material.

The present invention will now be described in detail by reference to the accompanying drawings, in which.

In the drawings, same reference numerals represent the same structural members.

Figure 1:
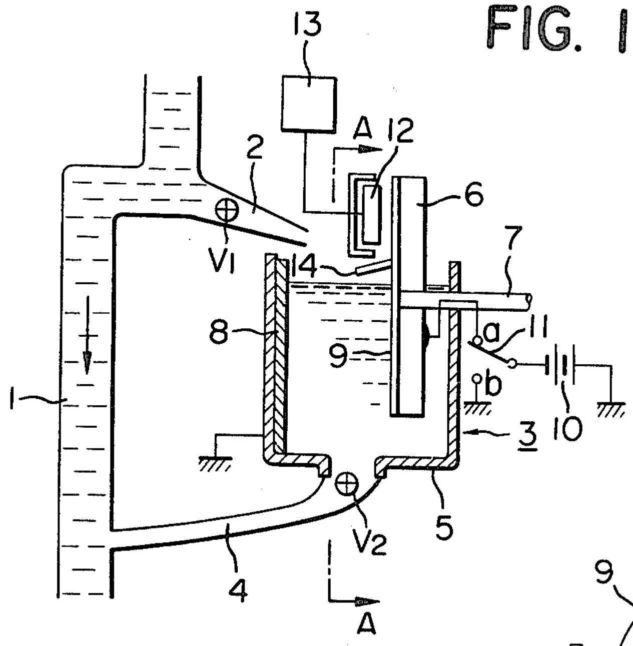
FIG. 1 illustrates one embodiment of the concentration detecting apparatus of the present invention in which an electric measurement method is adopted.
Figure 2:
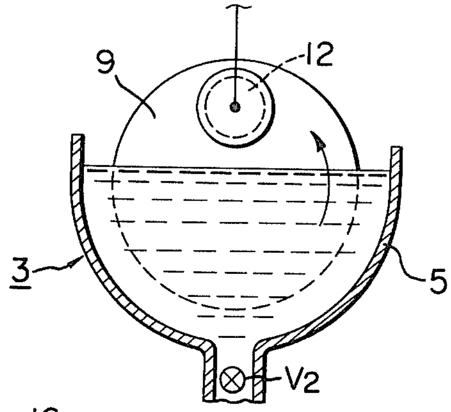
FIG. 2 is a view showing the section taken along the line A—A in FIG. 1, which illustrates the main portion of the apparatus shown in FIG. 1.

In an embodiment illustrated in FIGS. 1 and 2, a part of a liquid developer is introduced to a detection cell 3 through a liquid developer introduction pipe 2 from the midway of a liquid supply pipe 1 for supplying the liquid developer to a liquid developer tank to a developing head. After the toner concentration has been measured in the detecting cell 3, the liquid developer is returned to the liquid supply pipe 1 through a discharge pipe 4. In this detecting apparatus, the detecting cell 3 comprises a rotatable disc electrode 6 mounted and supported on the side wall of an insulating vessel 5. In this embodiment, the disc electrode 6 acts as the detecting member. The disc electrode 6 is formed of an electrically conductive material such as gold, silver, copper or aluminum or is formed by applying such conductive metal to the surface of an insulating material. The disc electrode 6 is rotated by a shaft 7 from the outside manually or by means of an electric motor (not shown). An electrically conductive plate 8 is attached to the confronting surface of the vessel 5 to form a counter electrode, and an insulating film 9 is applied to the surface of the disc electrode 6 at the part confronting the electrically conductive plate 8. The electrically conductive plate 8 may be formed of a metal, and copper, brass and aluminum are preferably used. An electric voltage of about 5000 V/cm is applied between the disc electrode 6 and the electrically conductive plate 8 from a power source 10 through a change-over switch 11 to form an electric field. Above the disc electrode 6, a surface potential detector 12 is disposed so that it confronts the insulating film 9.

The toner concentration is measured in this embodiment in the following manner. A valve $V_1$ disposed in the midway of the introduction pipe 2 is first opened and a valve $V_2$ disposed in the midway of the discharge pipe 4 is closed to introduce a part of a liquid developer from the liquid developer supply pipe 1 into the vessel 5 of the detecting cell 3, and when the liquid developer is introduced in a predetermined amount, preferably in such an amount that the lower half of the disc electrode 6 is immersed in the liquid developer, the valve $V_1$ is closed. When a voltage is applied between the disc electrode 6 and the electrically conductive plate 8 from the power source 10 while the change-over switch 11 is contacted to the side of a contact a, effective toner particles in the liquid developer are attracted and shifted to the disc electrode 6 according to the polarity thereof and they are attracted and stuck to the insulating film 9. Then, the change-over switch 11 is contacted to the side of a contact b to eliminate the electric field formed between the disc electrode 6 and the electrically conductive plate 8 and they are thus earthed. Then, the disc electrode 6 is rotated slowly, for example, at a rate of 3 rotations per minute, and the disc electrode 6 is taken out of the liquid developer with the toner particles being stuck to the surface of the insulating film 9. When the toner particle-stuck film of the disc electrode 6 arrives at the position of the surface potential detector element 12, the quantity of the charge possessed by the stuck toner particles is measured by the detector and detected by an electric circuit 13 including an amplifier and the like. Before the disc electrode 6 is immersed in the liquid developer again with rotation thereof, the measured particles are scraped down from the insulating film 9 by means of a cleaning blade 14.

The output signal from the electric circuit 13 is fed to a control circuit (not shown) for automatically supplying toner particles to the liquid developer.

The embodiment of FIG. 1 is usable for a color liquid developer without any additional means.

Figure 3:
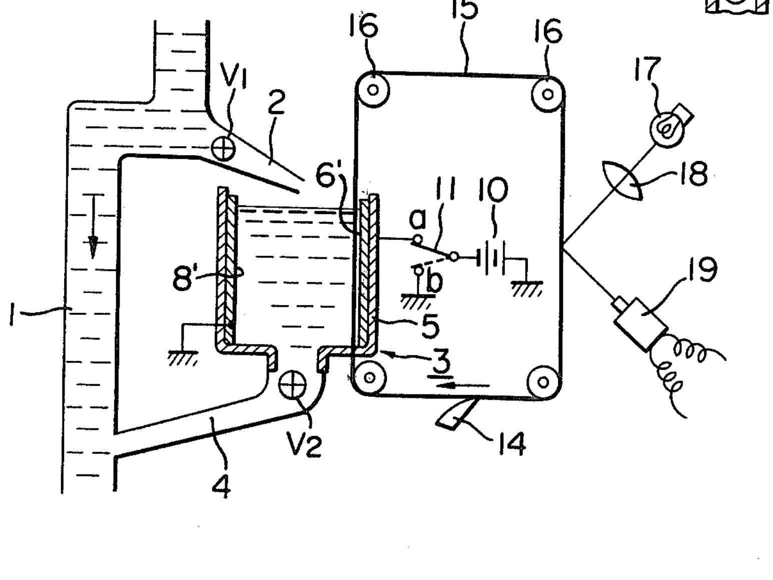
FIG. 3 illustrates another embodiment of the concentration detecting apparatus of the present invention in which an optical measurement method of the reflection type is adopted.

In an embodiment shown in FIG. 3, a pair of fixed electrodes are used and toner concentration is finally measured optically. In this detecting apparatus, a pair of confronting electrodes 6' and 8 are fixed to the confronting side walls of a vessel 5, respectively, and an electric voltage is applied between these electrodes from a power source 10 through a change-over switch 11 to form an electric field. An endless screen-like belt 15 is movably disposed in contact with or in the vicinity of the face of the electrode 6' at a part confronting to the electrode 8, so that charged toner particles are attracted and stuck to the belt 15 which is preferably formed of a flexible material which is stable against the developer, for example, special paper, poly-urethane, polyethylene, nylon, polyester, fluorine rubber or the like. Belt 15 is manually or electrically guided by a roller 16 and is moved in a direction indicated by an arrow. Along the passage of the belt 15, optical means for measuring the concentration of toner particles adhering to the belt. The optical means may comprise a light source 17, a lens 18 for converging rays from the light source 17 and a photo-electric conversion element 19 for converting rays reflected from the screen-like member 15 to electric signals. Output signals of the photo-electric conversion element 19 are fed to a known display apparatus or toner concentration control apparatus, so that display of the toner concentration and supply of the toner can be automatically accomplished. At the measurement step, the change-over switch 11 is contacted to the side of a contact b as described hereinbefore with respect to the first embodiment.

In the embodiment shown in FIG. 3, a pair of electrodes 6' and 8 are fixed to confronting inner faces of the side wall of the vessel 5, respectively. One electrode 6' may optionally be attached to an endless belt so that it can be moved, and after attraction of toner particles, the electrode 6' may be taken out from the interior of the vessel 5 to measure the toner concentration by optical means same as shown in FIG. 3.

When the embodiment of FIG. 3 is used for a color liquid developer, it is necessary to dispose a filter of complementary color just in front of the photo-electric conversion element 19 to improve S/N ratio.

Figure 4:
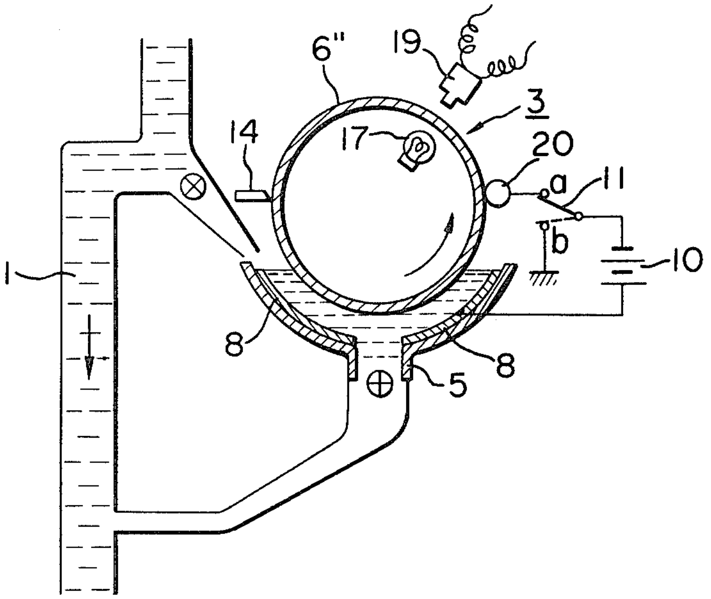
FIG. 4 illustrates still another embodiment of the concentration detecting apparatus of the present invention in which an optical measurement method of the transmission type is adopted.

FIG. 4 illustrates an embodiment in which the transmission type method is adopted for measurement of the toner concentration. An attracting electrode is a rotary sleeve 6'' composed of a light-transmitting conductive material such as NESA glass, and an electric voltage is applied from the power source through a change-over switch 11 by suitable means such as a slip ring 20. It is preferred that the intensity of the applied voltage be $1\text{-}10\times10^3$ V/cm, especially $5\text{-}8\times10^3$ V/cm. Another electrode 8 is disposed on the inner face of a vessel 5 of a detection cell 3. Charged toner particles in the liquid developer are electrically attracted and stuck to the surface of the rotary sleeve 6''. The rotary sleeve 6'' is rotated in a direction indicated by an arrow, and rays transmitted from the light source depending on the toner concentration are converted to electric signals by a photo-electric conversion element 19. After the measurement the toner particles are removed from the surface of the rotary sleeve 6'' by means of a cleaning blade 14.

When the embodiment of FIG. 4 is used for a color liquid developer, it is necessary to dispose a filter of complementary color just in front of the photo-electric conversion element 19 similarly to the embodiment of FIG. 3.

Figure 5:
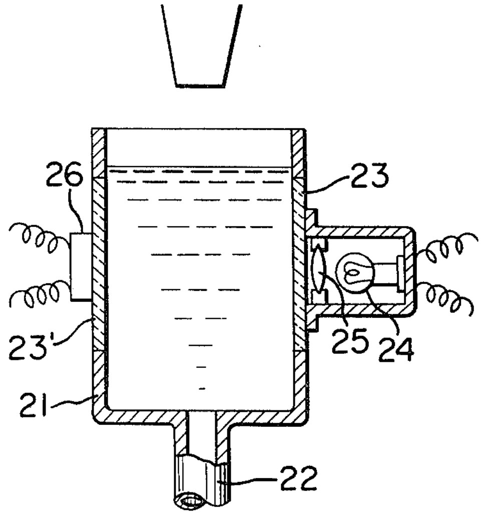
FIG. 5 is a view illustrating one embodiment of the apparatus for measuring degraded toner particles in the liquid developer left after measurement of effective toner particles.

FIG. 5 illustrates one embodiment of the apparatus for detecting toner concentration in the liquid developer left after attraction of charged toner particles in the foregoing embodiments and determining the degree of degradation of the toner. This degradation determining apparatus may be built in the above-mentioned toner concentration measuring apparatus or be connected in series thereto. This apparatus comprises a vessel 21 for receiving therein the residual liquid developer. The residual liquid developer is introduced into the vessel 21 from an upper opening and is discharged from an exit 22 disposed at the bottom of the vessel 21 after the measurement. Parts of confronting side walls of the vessel 21 are formed of transparent plates 23 and 23', and a light-emitting zone having light source 24 and lens 25 built therein is attached to one transparent plate 23 disposed on the outer wall of the vessel 21 and a light-receiving element 26 is attached to the other transparent plate 23'. Determination of degraded toners is accomplished by charging the residual liquid developer into the vessel 21, emitting rays from the light source 24, converting the quantity of rays received by the light-receiving element 26 to an electric signal and transmitting the electric signal to a display apparatus or measurement apparatus not shown in the drawings.

As will be apparent from the foregoing embodiments, according to the present invention, measurement of the concentration of electrically attached toner particles may be accomplished by the electric method using a surface potential detector or the optical method of the reflection type or transmission type, and any of these methods can optionally be adopted. Cleaning of toner particles may be performed according to need. Further, the toner concentration may be electrically detected by measuring changes of the electric resistance of attracted toner particles without using the surface potential detector. It also is possible to measure the concentration by transmitting rays through a liquid developer containing degraded toner particles and indicate the toner concentration based on the measured value.

Furthermore, the apparatus according to the invention can be designed to have properly selected volume of a detection cell and distance between a pair of confronting electrodes in dependence upon performance of detection means such as photo electric conversion element in use and it is therefore possible to adapt the apparatus to have an appropriate region of sensitivity.

In the present invention, since the toner concentration is measured by positively attracting and sticking charged effective toner particles in a liquid developer to a detecting member, the invention is effectively applicable to a liquid developer containing highly concentrated toner which has recently been employed, and the degraded toner has no bad influences on results of the measurement and the practical concentration can be precisely determined. Therefore, the tone concentration can be measured and controlled very accurately and minutely.

Other changes obvious to those skilled in this art are contemplated as falling within the scope of the present invention as defined by the claims which follow.

What we claim is:

1. A method for controlling toner concentration of a liquid developer, which includes the steps of conducting a part of the liquid developer into a detection cell, establishing an electric field in the detection cell, causing charged toner particles in the liquid developer to deposit upon a detection member under the influence of the electric field, removing the deposited toner particles from the liquid developer, and measuring the concentration of degraded toner particles left in the liquid developer after the deposited toner particles have been removed.

2. A method as set forth in claim 1, further comprising the step of measuring the concentration of the toner particles deposited on the detection member, thereby to determine the start or stop of the toner supply.

3. Apparatus for detecting concentration of a liquid developer, comprising a detection cell adapted to store a portion of the liquid developer to be tested, a first electrode positioned in said cell substantially within said liquid developer, means including a second electrode spaced from said first electrode for attracting and collecting charged toner particles of the liquid developer under the influence of an electric field, a source of DC voltage connected across said electrodes to establish said electrode field, means removing the collected toner particles from the liquid developer, and means for measuring the concentration of degraded toner particles remaining in the liquid developer in the cell.

4. Apparatus according to claim 3, in combination with means for measuring the concentration of the collected and removed toner particles.

5. Apparatus according to claim 3, in which the means for measuring the concentration of degraded toner particles comprises a light-emitting element positioned to direct its light through the remaining portion of the liquid developer, and a light-sensitive element positioned to receive the light passing through said liquid developer.

6. Apparatus according to claim 4, in which the said first electrode comprises a plate mounted upon an inner wall of said detection cell, in which said means for attracting and collecting charged toner particles includes a rotatable disc forming said second electrode, a portion of which is dipped in the liquid developer within the detection cell, and an insulating film on said disc, in which the means for removing said collected toner particles from the liquid developer includes means for rotating said disc, and in which the means for measuring the concentration of collected toner particles comprises a surface-potential detector positioned adjacent that portion of the insulating film on the disc removed from the liquid developer.

7. Apparatus according to claim 6, in combination with means removing the collected charged particles from the disc after the concentration of the collected charged particles has been measured.

8. Apparatus according to claim 4, in which the said first electrode comprises a plate mounted upon an inner wall of said detection cell, in which said means for attracting and collecting charged toner particles includes a second plate mounted upon an opposite inner wall of said detection cell and forming said second electrode and an endless belt of screen-like material positioned between said two plates adjacent said second plate, in which the means for removing said collected toner particles includes means for moving said endless belt into and out of said detection cell, and in which the means for measuring the concentration of the collected toner particles comprises a light source projecting light against that portion of the belt outside of the detection cell, and a light-sensitive element responsive to the light reflected from said belt.

9. Apparatus according to claim 8, in combination with means removing the collected charged particles from the belt after the concentration of collected charged particles has been measured.

10. Apparatus according to claim 4, in which said first electrode comprises a plate mounted along an inner wall of said detection cell, in which said means for attracting and collecting charged toner particles comprises a translucent electrically-conductive cylinder serving as said second electrode and means rotatably mounting said cylinder in said detection cell, spaced from said first electrode and with a circumferential portion thereof dipped into the liquid developer, in which the means for removing said collected toner particles from the liquid developer comprises means for rotating the surface of said cylinder into and out of said liquid developer, and in which the means for measuring the concentration of the collected toner particles comprises a light source positioned within said cylinder, and light-sensitive means positioned outside of said cylinder for receiving the light transmitted therethrough.

11. Apparatus according to claim 10, in combination with means removing the collected particles from the cylinder after concentration of the collected charged particles has been measured.

* * * * *